United States Patent
Zaum et al.

(10) Patent No.: US 11,442,462 B2
(45) Date of Patent: Sep. 13, 2022

(54) METHOD FOR CREATING A FEATURE-BASED LOCALIZATION MAP FOR A VEHICLE TAKING INTO ACCOUNT CHARACTERISTIC STRUCTURES OF OBJECTS

(71) Applicant: Robert Bosch GmbH, Stuttgart (DE)

(72) Inventors: Daniel Zaum, Sarstedt (DE); Peter Christian Abeling, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 265 days.

(21) Appl. No.: 16/767,764

(22) PCT Filed: Nov. 21, 2018

(86) PCT No.: PCT/EP2018/082122
§ 371 (c)(1),
(2) Date: May 28, 2020

(87) PCT Pub. No.: WO2019/115192
PCT Pub. Date: Jun. 20, 2019

(65) Prior Publication Data
US 2020/0348685 A1 Nov. 5, 2020

(30) Foreign Application Priority Data
Dec. 14, 2017 (DE) .......................... 102017222810.5

(51) Int. Cl.
*G06F 16/29* (2019.01)
*G05D 1/02* (2020.01)
(Continued)

(52) U.S. Cl.
CPC ........... *G05D 1/0246* (2013.01); *G01C 21/32* (2013.01); *G06F 16/29* (2019.01); *H04W 4/025* (2013.01)

(58) Field of Classification Search
CPC .. G05D 1/0246; G01C 21/32; G01C 21/3841; G01C 21/3859; G01C 21/3867;
(Continued)

(56) References Cited

U.S. PATENT DOCUMENTS

| | | | |
|---|---|---|---|
| 9,817,399 B2 | 11/2017 | Braunstein et al. | |
| 2014/0274137 A1 | 9/2014 | Carlsson et al. | |

(Continued)

FOREIGN PATENT DOCUMENTS

| | | | |
|---|---|---|---|
| DE | 102015220831 A1 | 4/2017 | |
| DE | 102016221688 A1 | 5/2018 | |

(Continued)

OTHER PUBLICATIONS

International Search Report for PCT/EP2018/082122, dated Feb. 13, 2019.

*Primary Examiner* — Kenneth J Malkowski
(74) *Attorney, Agent, or Firm* — Norton Rose Fulbright US LLP; Gerard Messina

(57) ABSTRACT

A method for creating a feature-based localization map for a vehicle, including the steps: ascertaining data of at least one object in the surroundings of the vehicle; identifying characteristic structures of the at least one object; combining the characteristic structures to form a simplification structure of the object; and incorporating the simplification structure into the feature-based localization map.

9 Claims, 3 Drawing Sheets a)　　　　　　b)　　　　　　c)

(51) Int. Cl.
*G01C 21/32* (2006.01)
*H04W 4/02* (2018.01)

(58) Field of Classification Search
CPC ....... G06F 16/29; H04W 4/025; G06V 10/44; G06V 20/56; G06K 9/00818; G06K 9/00805; G08G 1/09623; G08G 1/165
See application file for complete search history.

(56) References Cited

U.S. PATENT DOCUMENTS

| | | |
|---|---|---|
| 2016/0187144 A1 | 6/2016 | Modica et al. |
| 2018/0188037 A1* | 7/2018 | Wheeler .......... G08G 1/096827 |
| 2018/0189578 A1* | 7/2018 | Yang ..................... G01C 21/32 |

FOREIGN PATENT DOCUMENTS

| | | |
|---|---|---|
| JP | 2015184155 A | 10/2015 |
| WO | 2009133185 A1 | 11/2009 |
| WO | 2017021473 A1 | 2/2017 |

* cited by examiner

METHOD FOR CREATING A FEATURE-BASED LOCALIZATION MAP FOR A VEHICLE TAKING INTO ACCOUNT CHARACTERISTIC STRUCTURES OF OBJECTS

FIELD

The present invention relates to a method for creating a feature-based localization map for a vehicle. The present invention furthermore relates to a device for creating a feature-based localization map for a vehicle. The present invention furthermore relates to a computer program product.

BACKGROUND INFORMATION

Technologies from the field of simultaneous localization and mapping (SLAM) are available to create surroundings maps for individual measuring vehicles or large vehicle fleets with the aid of sensor data. Corresponding applications are found above all in the fields of robotics, logistics, automotive engineering, aviation, consumer goods, etc.

In particular graph-based SLAM methods have become accepted in order to create accurate surroundings maps from vehicle sensor observations (for example, in the form of radar, video, LIDAR, etc.).

In the case of SLAM without local reference, an automated measuring vehicle (for example, a robot) moves along an unknown path having defined measuring positions, the measuring vehicle being able to estimate its movement by movement estimations (for example, with the aid of inertial sensors, wheel rotation sensors, etc.). From each position, the measuring vehicle ascertains its surroundings with the aid of a series of measurements by targeting identified observations of landmarks.

Each of the landmarks may be observed under certain circumstances multiple times from each observation point, therefore more landmark measurements exist than actual landmarks.

The goal of graph SLAM or full SLAM is to ascertain the actual path of the measuring vehicle which the measuring vehicle has taken through the surroundings and/or the real positions of the surroundings from the measurements of the measuring vehicle. This is carried out by a comparison of landmarks which were ascertained at each measuring point. In this process, the actual map of the surroundings is also to be ascertained. This is carried out by corresponding measurements of the same landmark from different measuring points, these being used to carry out a measuring vehicle path estimation and the surroundings recognition simultaneously.

SUMMARY

One object of the present invention is to provide an improved method for creating a feature-based localization map for a vehicle.

The object may achieved according to a first aspect of the present invention. In accordance with an example embodiment, a method is provided for creating a feature-based localization map for a vehicle, including the steps:
  ascertaining data of at least one object in the surroundings of the vehicle;
  identifying characteristic structures of the at least one object;
  combining the characteristic structures to form a simplification structure of the object; and
  incorporating the simplification structure into the feature-based localization map.

In this way, semi-semantic analysis is carried out from the ascertained data, for example, in the form of sensor raw data, with the purpose of combining the complex structures to form simplified structures. In this way, a data volume of the digital feature-based localization map may be reduced and a localization quality may be substantially improved.

According to a second aspect of the present invention, the object may be achieved by a device for creating a feature-based localization map for a vehicle. In accordance with an example embodiment of the present invention, the device includes:
  an ascertainment unit for ascertaining data of at least one object in the surroundings of the vehicle;
  an identification unit for identifying characteristic structures of the at least one object;
  a combination unit for combining the characteristic structures to form a simplification structure of the object; and
  an incorporation unit for incorporating the simplification structure into the feature-based localization map.

Advantageous refinements of the method and device are described herein.

One advantageous refinement of the example method according to the present invention provides that at least one of a radar sensor, an ultrasonic sensor, a LIDAR sensor, a camera is used to ascertain the data of the at least one object in the surroundings of the vehicle. In this way, the method may be implemented using a variety of different sensor concepts. The mentioned ascertainment units may detect the data of the at least one object in the surroundings of the vehicle separately and/or also in a combined operating mode.

A further advantageous refinement of the example method according to the present invention provides that prior knowledge is used to identify the characteristic structures of the at least one object. In this way, the identification of the characteristic structures of the at least one object may be carried out even more efficiently and rapidly. For example, catalogs including product types and/or types of structures, which are kept at the most up-to-date state, may be used for this purpose.

A further advantageous refinement of the example method according to the present invention provides that the map is updated at defined intervals, preferably after a defined number of days, still more preferably after a defined number of hours. In this way, a high utility value of a feature-based localization map designed in this way is of assistance for many users.

A further advantageous refinement of the example method according to the present invention provides that the data of objects in the surroundings of vehicles are provided with the aid of a crowdsourcing-based approach. In this way, dedicated ascertainment vehicles advantageously do not have to detect the data of the objects, but rather normal road users may contribute to creating the provided feature-based localization map. An ascertainment quality is advantageously increased in this way.

The present invention is described in greater detail below with further features and advantages on the basis of multiple figures.

Provided method features result similarly from correspondingly provided device features and vice versa. This means in particular that features, technical advantages, and statements relating to the method result similarly from corresponding statements, features, and technical advantages relating to the device for creating a feature-based localization map for a vehicle and vice versa.

DETAILED DESCRIPTION OF EXAMPLE EMBODIMENTS

Figure 1:
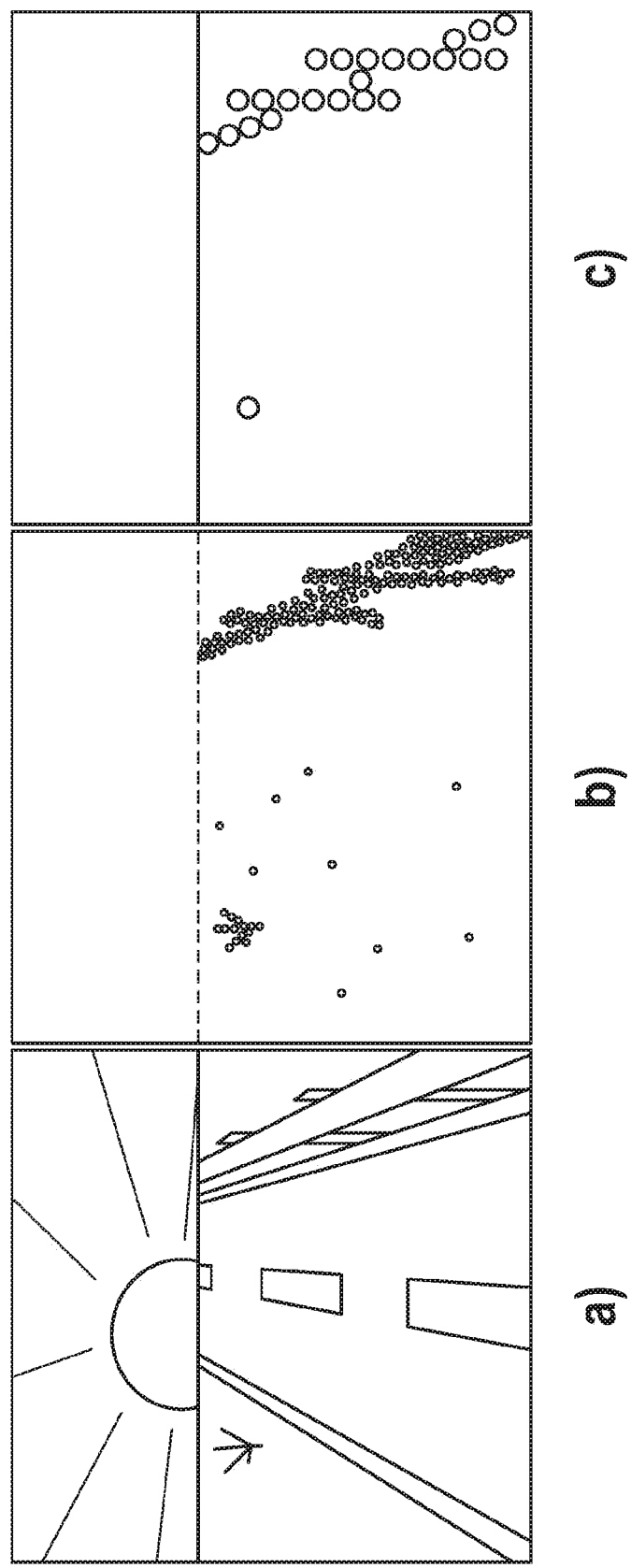
FIGS. 1a-1c show a representation of an operating mode of conventional SLAM-based map creation.

An automated motor vehicle may also be understood hereafter to be synonymous with a semi-automated motor vehicle, an autonomous motor vehicle, and a semi-autonomous motor vehicle.

Methods and systems for mapping traveled roads with the aid of sensors (for example, cameras, radar sensors, ultrasonic sensors, etc.) installed in the vehicles are convention. In addition to the mentioned sensors, these systems generally also include a radio interface (for example, implemented via a connectivity unit) for transmitting the measured sensor data to a server. In this way, entire vehicle fleets may map their collective surroundings with the aid of the vehicle sensors in that they transmit their sensor data, for example, to a server. The transmission of such so-called "fleet mapping data" is conventional.

The sensor data are collected on the server and a digital map for the relevant road section is generated from the data of multiple trips and/or vehicles. The digital maps ascertained in this way (also called HAD maps, AD maps, or HD maps) are used, inter alia, so that automatically driving vehicles may localize themselves in the digital map (for example, for an ascertainment of trajectories). For this purpose, so-called landmarks are used, which are recorded in the digital map with their exact geographical position.

Typical landmarks are, for example, roadway markings, road signs, guard rails, etc. If an automatically driving vehicle recognizes one or multiple landmarks with the aid of the vehicle sensors and may unambiguously find these landmarks in the digital map, a very accurate relative position of the vehicle in relation to the landmark of the digital map may be derived therefrom. A density and quality of the landmarks thus significantly influences a quality of the local localization with regard to the accuracy of the ascertained position. In reality, route sections exist in which many and well usable landmarks are present, and also sections in which a poor coverage of landmarks exists, so that a poor quality of the localization may result therefrom under certain circumstances.

The mentioned graph-based SLAM algorithms are used for the purposes of the mapping and may be divided in principle into two fundamental steps:

1. SLAM Frontend

This step provides that identical features of multiple visits to the same territory are determined by a comparison of recognized landmarks.

The identified relationships between measuring positions of different trips are expressed as edges of a graph representation.

2. SLAM Backend

An optimization of the graph results of the above-mentioned frontend step takes place with the purpose of finding an optimum approach which meets all conditions.

As stated above, one of the core aspects of the SLAM-generated maps is that the data of multiple trips along the route are incorporated into the map. Therefore, most real-world objects are represented multiple times in the map after the optimization step, after they have been observed during every trip which contributes to the map.

Therefore, optimized data of multiple trips are consolidated in a final clustering step, which is referred to as feature map creation, with the goal of reducing the map size and optimizing map contents with respect to feasibility out of carrying out the localization. All above-mentioned steps are already available in the related art.

In the field of automated driving, SLAM technologies are used to generate maps from crowdsourcing-based data, which enable a precise feature-based localization. Robert Bosch is very active in this technical field with the announced products "Radar Road Signature" and "Video Road Signature."

The feature-based localization provides that a mapped representation of observed objects in the surroundings of the vehicle is compared to an instantaneous surroundings sensing of the vehicle and is adjusted thereto. This results in an estimation of the instantaneous vehicle position in relation to the localization map.

A consolidation and/or clustering step as explained above in SLAM-based map generation generally functions very well using conventional algorithms in the case of punctiform targets, for example, poles for traffic signs.

FIG. 1 shows, in three views a), b), c), a principle of an ascertainment of an adjusted radar localization map and a corresponding idealized consolidation of this map using conventional methods for clustering punctiform objects. Guardrail fastening points of the map detected with the aid of a radar sensor are apparent in FIG. 1a. It is indicated in FIG. 1c that the detected guardrail fastening points are adequately represented by individual points in the consolidated representation.

Nonetheless, some structures in the representation are not adequately described using the punctiform representations of the guardrail fastening points. This may disadvantageously reduce an efficiency of a localization map, which only provides punctiform objects for an adjustment process in the course of the localization.

An improved method is provided according to the present invention having the following advantages:

A consolidation of radar-based localization maps using not only punctiform objects, but rather also objects having arbitrary structures and shapes, which are represented in the form of "simplification structures"
  Reduced data volume thus caused by resulting consolidated maps Improved localization results due to improved object representations achieved with the aid of the simplification structures.

One feature of the present invention is to provide representations of feature-based localization maps not only using punctiform representations of objects, but rather to provide that complex structures are described in a more complex way, to thus improve the adjustment of data with the localization map and the localization quality. Because a semantic description of all types of complex shapes which a radar sensor may detect cannot be carried out, it is provided that complex structures are represented using a larger number of points, which is still low in comparison to a semantic description, however.

Figure 2:
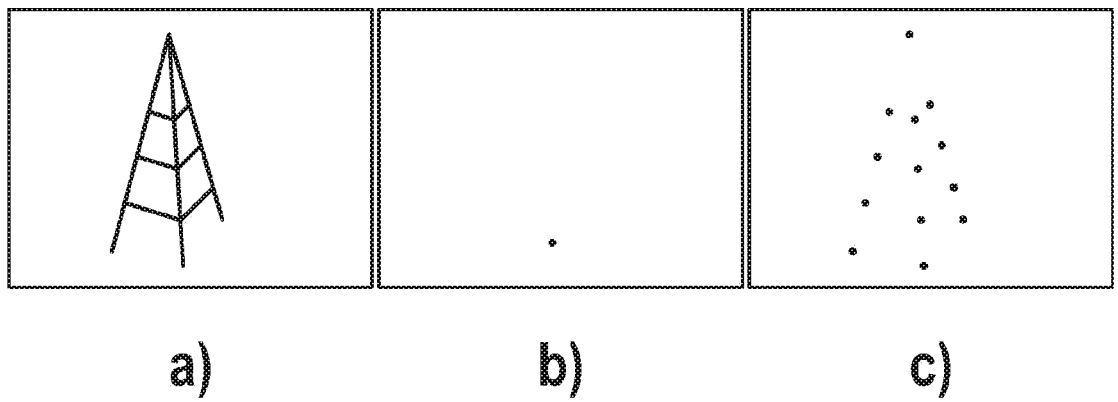
FIGS. 2a-2c show representations of an electric utility pole (FIG. 2a) and an operating mode of conventional SLAM-based map creation (FIG. 2b) and SLAM-based map creation according to the present invention (FIG. 2c).

One principle of this procedure is shown in three representations a), b), and c) of FIG. 2. An exemplary complex object in the form of a symbolically shown electrical utility pole is apparent in FIG. 2a, which is represented in FIG. 2b in a conventional way by a single punctiform object.

Figure 3:
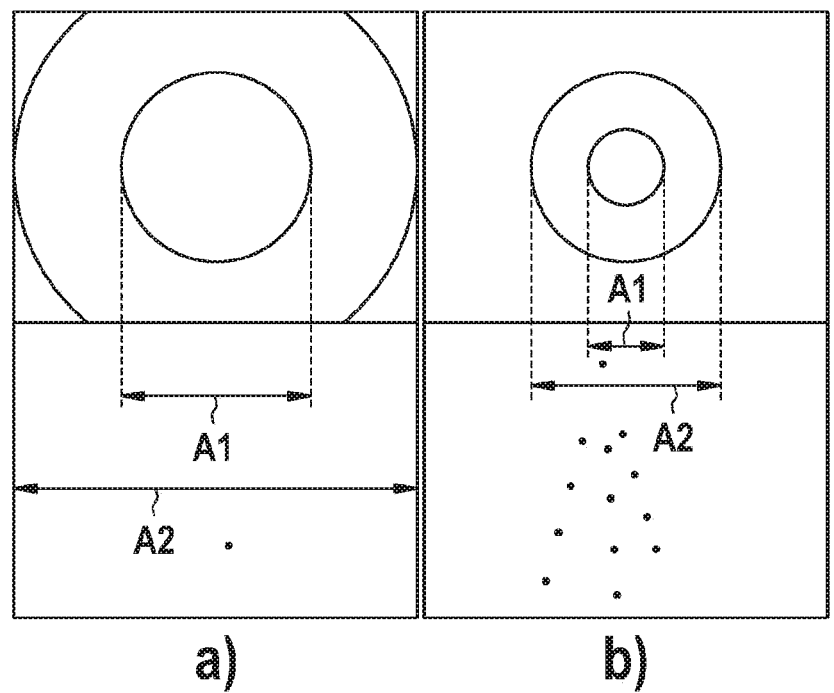
FIGS. 3a and 3b show representations in principle of effects of conventional SLAM-based map creation (FIG. 3a) and SLAM-based map creation according to the present invention (FIG. 3b).

It is provided according to the present invention that the electrical utility pole is represented by a structure having multiple points as in FIG. 2c, which implements a semi-semantic representation of the object "utility pole." This semi-semantic representation abstracts data of an instantaneous radar measurement in a more accurate way and permits a higher precision in the above-explained adjustment process of the detected data, as is shown in principle in two representations a) and b) of FIG. 3.

FIG. 3a shows probability ranges A1, A2 of a localization, which is linked to a specific representation of the object. A relatively large range A1 of high localization quality and a relatively large range A2 of low localization quality are apparent, based on a punctiform representation, for example, of an object "utility pole" in the feature-based localization map.

In contrast, FIG. 3b, which is depicted in the same scale as FIG. 3a, shows that the two mentioned probability ranges A1, A2 are advantageously substantially reduced by a representation of the object "utility pole" in the above-mentioned semi-semantic way using multiple points. As a result, in comparison to the conditions of FIG. 3a, more accurate location of the vehicle is achievable with the aid of the feature-based localization map and detected radar sensor data.

This, thus, advantageously assists an autonomous or automated driving function in being able to be maintained longer for an automated vehicle. In the case in which the localization with the aid of the detected sensor data and the feature-based localization map is no longer possible, for example, the autonomous or automated driving function is switched off, whereupon the driver at least temporarily has to take over a manual control of the vehicle.

Although the explained method was described by way of example using a radar sensor, it is obvious that the provided method may also be carried out using other sensors, for example, a LIDAR sensor, an ultrasonic sensor, and/or a camera.

The creation of such a feature-based localization map preferably takes place using a crowdsourcing-based approach, so that a large number of vehicles, which do not function as dedicated ascertainment vehicles, transmit the detected data to a central point (not shown), which creates the feature-based localization map in a very up-to-date manner, for example, using a defined updating frequency of a few days or hours.

The vehicles providing the feature-based data may thus be both data suppliers for the feature-based localization map and simultaneously users of the up-to-date created map.

Figure 4:
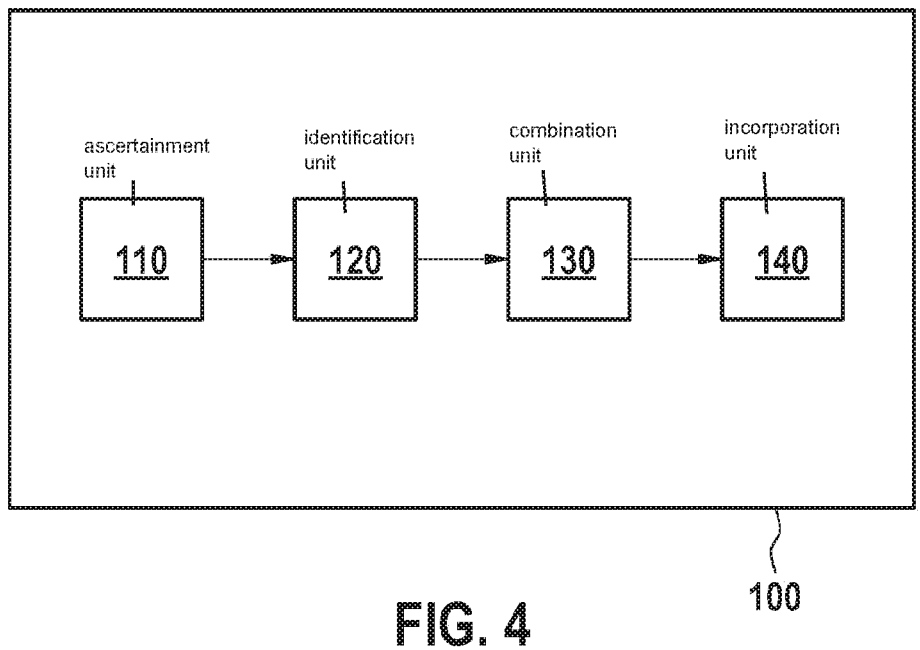
FIG. 4 shows a block diagram of an example device according to the present invention for creating a feature-based localization map for a vehicle.

FIG. 4 fundamentally shows a block diagram of a device 100 for creating a feature-based localization map.

An ascertainment unit 110 for ascertaining data with the aid of an object in the surroundings of the vehicle is apparent. Ascertainment unit 110 is functionally connected to an identification unit 120, which is provided for identifying characteristic structures of the at least one object.

Identification unit 120 is functionally connected to a combination unit 130, which is provided for combining the characteristic structures to form a simplification structure of the object. Combination unit 130 is functionally connected to an incorporation unit 140, which is provided for incorporating the simplification structure into the feature-based localization map.

The example method according to the present invention may advantageously be implemented as software having program code means to run on an electronic device 100, whereby an easy changeability and adaptability of the method is supported.

Figure 5:
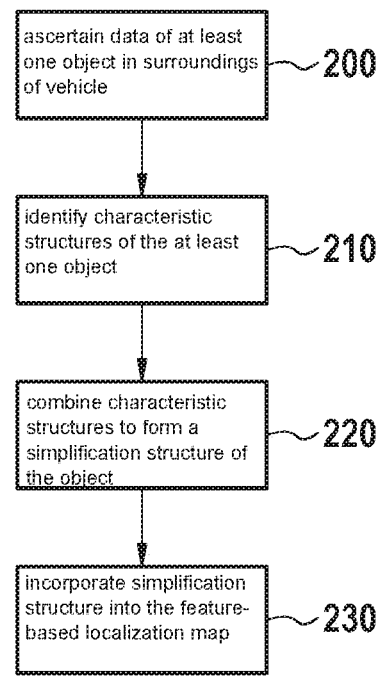
FIG. 5 shows an example sequence of an example method according to the present invention for creating a feature-based localization map for a vehicle.

FIG. 5 shows in principle a sequence of one specific embodiment of the method according to the present invention.

In a step 200, an ascertainment of data of at least one object in the surroundings of the vehicle is carried out.

In a step 210, an identification of characteristic structures of the at least one object is carried out.

In a step 220, a combination of the characteristic structures to form a simplification structure of the object is carried out.

In a step 230, an incorporation of the simplification structure into the feature-based localization map is carried out.

Those skilled in the art will modify and/or combine the features of the present invention in a suitable way without departing from the core of the present invention.

What is claimed is:

1. A method for creating a feature-based localization map for a semi-autonomous and/or autonomous vehicle, the method comprising:
   ascertaining, via an ascertainment unit, data of at least one object in surroundings of the semi-autonomous and/or autonomous vehicle;
   identifying, via an identification unit, characteristic structures of the at least one object, wherein the ascertainment unit is functionally connected to the identification unit;
   combining, via a combination unit, the characteristic structures to form a simplification structure of the object, wherein the combination unit is functionally connected to the identification unit; and
   incorporating, via an incorporation unit, the simplification structure into at least one feature-based localization map, wherein the combination unit is functionally connected to the incorporation unit;
   wherein the ascertainment unit, the identification unit, the combination unit, and the incorporation unit are included in an electronic device having a processor, and
   wherein the at least one feature-based localization map includes a plurality of sensor-based localization maps, wherein the sensor-based localization maps are consolidated and include punctiform objects and objects having arbitrary structures and shapes, which are represented in the form of simplification structures, so that data volumes are reduced based on the consolidated radar-based localization maps, and wherein localization results are improved using object representations based on the simplification structures, wherein the punctiform objects include multiple points.

2. The method as recited in claim 1, wherein at least one of: a radar sensor, and/or an ultrasonic sensor, and/or a LIDAR sensor, and/or a camera, is used to ascertain the data of the at least one object in the surroundings of the vehicle.

3. The method as recited in claim 1, wherein catalogs including product types and/or types of structures are used to identify the characteristic sections of the at least one object.

4. The method as recited in claim 1, wherein the map is updated at defined intervals.

5. The method as recited in claim 1, wherein the map is updated after a defined number of days.

6. The method as recited in claim 1, wherein the map is updated after a defined number of hours.

7. The method as recited in claim 1, wherein the data of the at least one object in the surroundings of vehicles are provided using a crowdsourcing-based approach.

8. A device for creating a feature-based localization map for a semi-autonomous and/or autonomous vehicle, comprising:
- an ascertainment unit to ascertain data of at least one object in surroundings of the semi-autonomous and/or autonomous vehicle;
- an identification unit to identify characteristic structures of the at least one object, wherein the ascertainment unit is functionally connected to the identification unit;
- a combination unit to combine the characteristic sections to form a simplification structure of the object, wherein the combination unit is functionally connected to the identification unit; and
- an incorporation unit to incorporate the simplification structure into the feature-based localization map, wherein the combination unit is functionally connected to the incorporation unit;
- wherein the ascertainment unit, the identification unit, the combination unit, and the incorporation unit are included in an electronic device having a processor, and
- wherein the at least one feature-based localization map includes a plurality of sensor-based localization maps, wherein the sensor-based localization maps are consolidated and include punctiform objects and objects having arbitrary structures and shapes, which are represented in the form of simplification structures, so that data volumes are reduced based on the consolidated radar-based localization maps, and wherein localization results are improved using object representations based on the simplification structures, wherein the punctiform objects include multiple points.

9. A non-transitory computer-readable medium, on which is stored a computer program, which is executable by a processor, comprising:
- a program code arrangement having program code for creating a feature-based localization map for a semi-autonomous and/or autonomous vehicle, by performing the following:
  - ascertaining, via an ascertainment unit, data of at least one object in surroundings of the semi-autonomous and/or autonomous vehicle;
  - identifying, via an identification unit, characteristic structures of the at least one object, wherein the ascertainment unit is functionally connected to the identification unit;
  - combining, via a combination unit, the characteristic structures to form a simplification structure of the object, wherein the combination unit is functionally connected to the identification unit; and
  - incorporating, via an incorporation unit, the simplification structure into at least one feature-based localization map, wherein the combination unit is functionally connected to the incorporation unit;
- wherein the ascertainment unit, the identification unit, the combination unit, and the incorporation unit are included in an electronic device having the processor, and
- wherein the at least one feature-based localization map includes a plurality of sensor-based localization maps, wherein the sensor-based localization maps are consolidated and include punctiform objects and objects having arbitrary structures and shapes, which are represented in the form of simplification structures, so that data volumes are reduced based on the consolidated radar-based localization maps, and wherein localization results are improved using object representations based on the simplification structures, wherein the punctiform objects include multiple points.

* * * * *